United States Patent
Liu et al.

(10) Patent No.: US 6,498,876 B1
(45) Date of Patent: *Dec. 24, 2002

(54) MULTI-PORT FIBER OPTIC DEVICE WITH V-GROOVE FERRULE

(75) Inventors: Yuqiao Liu, Sunnyvale, CA (US); Peter C. Chang, Mountain View, CA (US)

(73) Assignee: Alliance Fiber Optics Products, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/577,200

(22) Filed: May 23, 2000

Related U.S. Application Data

(63) Continuation-in-part of application No. 09/488,937, filed on Jan. 21, 2000, now Pat. No. 6,396,980, and a continuation-in-part of application No. 09/255,047, filed on Feb. 22, 1999, now Pat. No. 6,246,812.

(51) Int. Cl.$^7$ ................................................. G02B 6/32
(52) U.S. Cl. ............................ 385/34; 385/24; 385/33; 385/65; 359/124; 359/131
(58) Field of Search ............................ 385/24, 31, 33, 385/34, 65; 359/124, 131

(56) References Cited

U.S. PATENT DOCUMENTS

| | | | | | |
|---|---|---|---|---|---|
| 5,796,889 A | * | 8/1998 | Xu et al. | ........................ | 385/24 |
| 5,809,193 A | * | 9/1998 | Takahashi | ..................... | 385/79 |
| 5,845,023 A | * | 12/1998 | Lee | .............................. | 385/33 |
| 6,023,542 A | * | 2/2000 | Pan et al. | ........................ | 385/24 |
| 6,118,910 A | * | 9/2000 | Chang | ........................... | 385/16 |
| 6,246,812 B1 | * | 6/2001 | Liu et al. | ........................ | 385/34 |
| 6,272,264 B1 | * | 8/2001 | Li et al. | ......................... | 385/27 |

* cited by examiner

Primary Examiner—Akm E. Ullah
Assistant Examiner—Jennifer Doan

(57) ABSTRACT

A multi-port fiber optic device (100) includes a pair of opposite collimators (50, 51), of which each includes a V-groove dual fiber ferrule (20, 21) with a GRIN rod lens (2, 1). At least one band-pass DWDM thin film filter (4) is securely sandwiched between the two opposite GRIN rod lens (2, 1) of the pair of collimators (20, 21). The V-groove dual fiber ferrule (20, 21) is used to couple light in and out thereof and tune the thin film filter center wavelength to the ITU grid. The light coupled in from the input fiber (13) of the V-groove dual fiber ferrule (20) will be collimated and transmitted to the DWDM thin film filter (4). The part of the in-pass-band light will pass through the filter (4) as performing a demultiplexed channel and is successively coupled into the other collimator (21) aside.

10 Claims, 1 Drawing Sheet

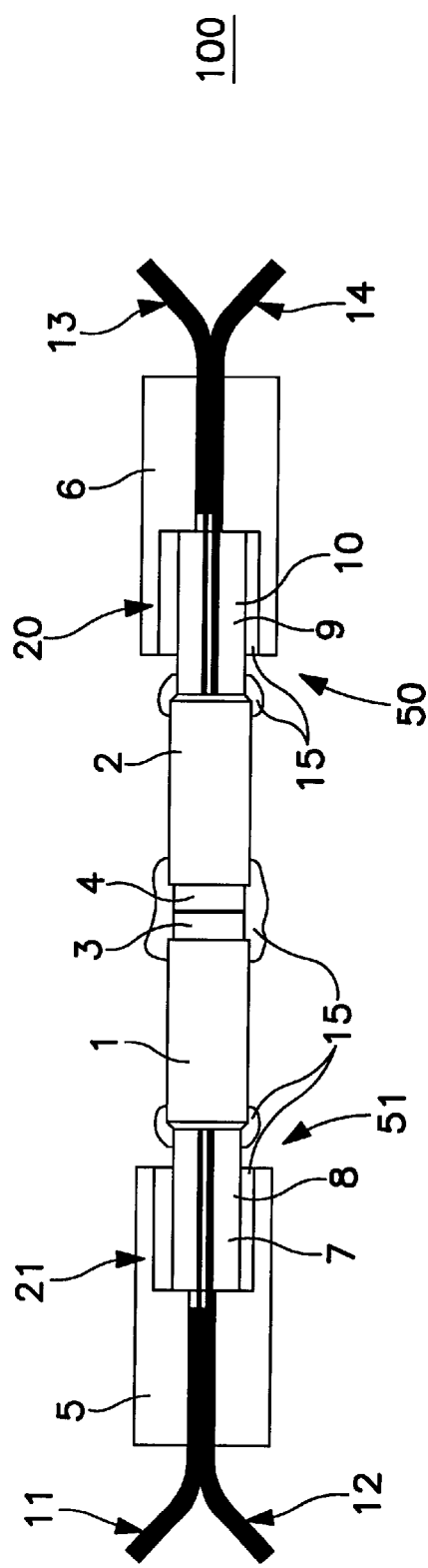
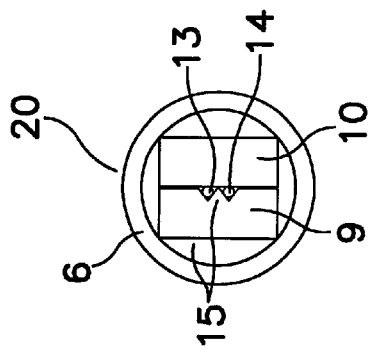
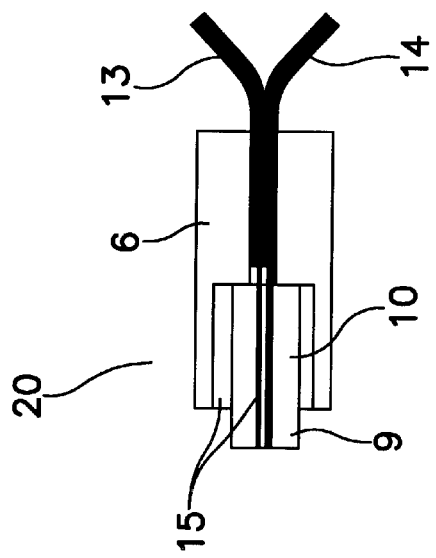

US 6,498,876 B1

MULTI-PORT FIBER OPTIC DEVICE WITH V-GROOVE FERRULE

This is a Continuation-in-part application of the copending application Ser. No. 09/255,047, filed on Feb. 22, 1999, now U.S. Pat. No. 6,246,812 and a Continuation-in-part application of Ser. No. 09/488,937, filed on Jan. 21, 2000, now U.S. Pat. No. 6,396,980.

BACKGROUND OF THE INVENTION

1. Field of the Invention

The invention relates to the technology of making optical DWDM (Dense-Wavelength-Division-Multiplexing) multiplexor or demultiplexor, and particularly to the DWDM multiplexor or demultiplexor provided with a pair of so-called built-in V-groove dual fiber collimators.

2. The Related Arts

The future communication networks demands ever increasing bandwidth. By transmitting several channels in a single optical fiber at different wavelengths. DWDM can dramatically enhance the transmission capacity of the optical fiber communication systems. A devices that combines different wavelength channels into one fiber is a multiplexor, and a device that divides the multiplexed channels into individual ones is a demultiplexor. A variety of technologies have been exploited to develop high performance DWDM multiplexor/demultiplexor, including fiber Bragg grating, optical integrated circuit, fused fiber Mach-Zander interferometer, interference thin film coating technology etc. An international standard wavelength grid has been suggested by the ITU (International Telecommunication Union) for the center wavelengths of the DWDM channels. Generally, the center wavelength of a band-pass optical filter is tuned to the ITU grid by the incident angle of the beam onto DWDM bandpass filter. The prior art uses an Y-branch structure of three conventional fiber optic collimators. The incident angle is tuned by changing the angles between the associated collimators, and thus the center wavelength of such a multiplexor/demultiplexor is made to coincide with a desired ITU wavelength. The disadvantage in the prior art is mainly in difficulties to reduce the size of the assembly for achieving a robust and compact structure. The relates references include U.S. Pat. Nos. 4,464,022, 5,204,771, 5,574, 596, 5,629,955, 5,712,717, 5,748,350, 5,764,825, 5,786,915, 5,799,121 and 5,808,763.

Therefore, it is desired to provide a DWDM multiplexor/demultiplexor with characteristics of the compact and robust structure, lower cost and flexibility in manufacturing, and high stability in hazardous environment.

SUMMARY OF INVENTION

According to an aspect of the invention, a multi-port fiber optic device includes a pair of opposite collimators, of which at least one includes a V-groove dual fiber ferrule, and each has a GRIN rod lens. At least one band-pass DWDM thin film filter is securely sandwiched between the two opposite GRIN rod lens of the pair of collimators. The V-groove dual fiber ferrule is used to couple light in and out thereof and tune the thin film filter center wavelength to the ITU grid. The light coupled in from the input fiber of the V-groove dual fiber ferrule will be collimated and transmitted to the DWDM thin film filter. The part of the in-pass-band light will pass through the filter as performing a demultiplexed channel and is successively coupled into the other collimator aside. On the other hand, the out-pass-band is coupled back into the output fiber of the V-groove dual fiber ferrule for being transmitted to the next stage for demultiplexing other channels. The epoxy joints are applied among the filter, the GRIN rod lens and the V-groove ferrule. The two opposite collimator are aligned with each other for the minimum loss therebewteen and the minimum size of the total assembly.

BRIEF DESCRIPTION OF THE DRAWINGS

FIG. 1 is a side view of a multi-port fiber optic device with the V-groove dual fiber ferrule according to the invention.

FIG. 2 is aside view of the input V-groove dual fiber ferrule in FIG. 1.

FIG. 3 is a side view of the V-groove dual fiber ferrule in FIG. 2.

DETAILED DESCRIPTION OF THE PREFERRED EMBODIMENT

References will now be in detail to the preferred embodiments of the invention. While the present invention has been described in with references to the specific embodiments, the description is illustrative of the invention and is not to be construed as limiting the invention. Various modifications to the present invention can be made to the preferred embodiments by those skilled in the art without departing from the true spirit and scope of the invention as defined by appended claims.

It will be noted here that for a better understanding, most of like components are designated by like reference numbers therethrough the various figures in the embodiments. Attention is directed to FIGS. 1–3 wherein a multi-port fiber optic device 100 includes a pair of opposite first and second collimators 50, 51. The first collimator 50 includes a first V-groove dual fiber ferrule 20 and a first GRIN rod lens combined in front thereof. The first dual fiber ferrule 20 includes a guiding sleeve 6 retainably enclosing a V-groove chip 6 and a cover chip 10 therein. A first input pigtail fiber 13 and a first output pigtail fiber 14 are positioned in the two corresponding grooves (not labeled) in the chip 6 and extend along the axial direction of the ferrule 20. A first thin film DWDM filter 4 is attached to the front end of the GRIN rod lens 2 and opposite to the corresponding first dual fiber ferrule 20.

Similarly, the second collimator 51 includes a second dual fiber ferrule 21 and a second GRIN rod lens 1 combined in front thereof. The second dual fiber ferrule 21 includes a second guiding sleeve 5 retainably enclosing a V-groove chip 7 and the cover chip 8 threaded therein. An idle pigtail fiber 11 and a second output pigtail fiber 12 are received within the corresponding grooves (not labeled) and extend along the axial direction of the ferrule 21. In this embodiment, a second thin film DWDM filter 3 is attached to the front end of the first GRIN rod lens 1.

Similar to the aforementioned copending parent application Ser. No. 09/488,937, the first collimator 50 and the second collimator 51 are properly aligned with each other for adjustably defining a correct and proper transmission path therebetween. While different from the corresponding components disclosed in that parent application, the GRIN rod lens 2 with the associated filter 4 and the GRIN rod lens with the associated filter 3 are positively secured with each other under a situation that the filter 4 and the filter 3 are substantially sandwiched between the first GRIN rod lens 2 of the first collimator 50 and the second GRIN rod lens of the second collimator 51.

The transmission theory and way of the invention are similar to that disclosed in the copending application wherein the multiplexed DWDM signal is coupled into the multi-port fiber optic device 100 through the first input fiber 13. The part of the in-pass-band light will pass through the filter 4 as a demultiplexed channel and is coupled to the second output fiber 12 of the second collimator 51 and out of the subject multi-port fiber optic device 100. Oppositely, the part of the out-pass-band light is coupled back to the first output fiber 14 of the first collimator 50 for being transmitted to the next stage and further additionally demultiplexing other channels.

It is noted that as disclosed in the copending parent application, the two grooves in the chip 6 facilitates to precisely determine the distance between the two corresponding fibers 13, 14, and thus by selectively using the predetermined chip 6, the spacing between the two fibers 13, 14 matches the incidence angle requirement that the filter center wavelength substantially coincides with a designated ITU grid line.

It is also noted that the first input dual fiber ferrule 20 are aligned to the first GRIN rod lens 2 with their axes coincident and their angled end surfaces facing to each other. The relative position between these angled end faces is adjusted and aligned, and the first ferrule 20 and the first GRIN rod lens 2 are fixed together by adhesives 15. Therefore, the two light beams, which are collimated into and out of the dual fiber ferrule 20 through the fibers 13 and 14, coincide with each other at the place where the filter 4 is located, thus reducing the insertion loss between the fibers 13 and 14.

It is noted that the second collimator 51 generally includes the similar components to the first collimator 50, and is assembled via the similar way. It should be contemplated that the second filter 3 may be omitted in another embodiment because it generally enhances isolation and reduces the residual adjacent channel cross-talk. By removing the second filter 3 in another embodiment, the filter 4 may be directly sandwiched between the two opposite GRIN rod lens 2 and 1 with adhesives bonding thereamong. And the second collimator 51 can also be replaced by a conventional single fiber collimator. It can be understood that the first collimator 50 and the second collimator 51 are generally symmetric with each other in the whole device 100 for minimizing the insertion loss in alignment and also keeping these two collimators 50 and 51 in a parallel relation, thus reducing the size and enhancing the total stability of the whole structure thereof.

It is appreciated that one of the end surfaces of each GRIN rod lens 1, 2 is angled to its own axis in order to reduce back reflections in the corresponding collimator 50, 51. Similarly, the front ends of the chips 9&10, 7&8 of the ferrule 20, 21 is grounded and polished with an angle relative to its own axis for the same purpose. An anti-reflection coating is applied thereto.

As mentioned in the copending parent application, by altering the spacing between the two grooves in the chip 9, 7, a series of chips can be made to comply with the different center wavelengths of the optical bandpass filter to coincide with that of the ITU grid for DWDM applications. Additionally, the second input fiber I 1 in the second collimator 51 is normally idle. The adhesives 15 are applied to the places between the chips 9, 10(7, 8) and the guiding sleeve 6(5), between the GRIN rod lens 2(1) and the chips 9, 10(7, 8), and among the GRIN rod lenses 1, 2 and the associated filters 4, 3.

In conclusion, the invention provides a compact and robust structure with low cost and high flexibility in selectively achieving different spacing in the dual fiber ferrule.

The symmetric pair of collimators achieve straight alignment of the device, thus reducing the size and the enhancing the whole stability of the structure. All the components including the ferrules, the GRIN rod lenses with the associated filters are aligned and adhered together as one piece, thus simplifying the assembling procedure and reducing the cost.

While the present invention has been described with reference to specific embodiments, the described is illustrative of the invention and is not to be construed as limiting the invention. Various modifications to the present invention can be made to the preferred embodiments by those skilled in the art without departing from the true spirit and scope of the invention as defined by the appended claims.

Therefore, persons of ordinary skill in this field are to understand that all such equivalent structures are to be included within the scope of the following claims.

We claim:
1. A multi-port fiber optic device comprising:
   two opposite collimators, each of said collimators including:
      a dual fiber ferrule and a GRIN rod lens attached in front thereof;
      an input fiber and an output fiber received within the dual fiber ferrule; and
      at least a filter disposed on a front end of one of said collimator;
   wherein
      sad at least one filter is sandwiched between the two GRIN rod lenses of said two collimators, and said two GRIN rod lenses are secured to each other by adhesives; wherein;
      said dual fiber ferrule includes a pair of V-shaped grooves for receiving the input fiber and the output fiber therein; wherein
      two light beams collimated through the input fiber and the output fiber, coincide with each other at a position where the filter is located, thus reducing the insertion loss between the input fiber and the output fiber.
2. The device as defined in claim 1, wherein said two collimators are symmetric with each other in said device for minimizing insertion loss and reducing a size of the device.
3. The device as defined in claim 1, wherein a second filter is positioned at a front end oaf the other of said collimators for enhancement of isolation and reduction of cross-talk.
4. A multi-port fiber optic device comprising:
   first and second collimators opposite to each other;
      the first collimator including a first GRIN rod lens and a first dual fiber ferrule secured with each other, a first input fiber and a first output fiber being received within the first dual fiber ferrule in a spatial parallel relationship, a first filter being positioned at a front end of the first GRIN rod lens; and
      the second collimator including a second GRIN rod lens and a second dual fiber ferrule secured with each other, an idle fiber and a second output fiber being received within the second dual fiber ferrule in spatial parallel relationship; wherein the first GRIN rod lens and the second GRIN rod lens are head-to-head confronting each other with the first filter therebewteen and bonded by adhesives;
   wherein
      said first dual fiber ferrule includes a pair of V-shaped grooves for receiving the first input fiber and first output fiber therein; wherein
      two light beams collimated through said first input fiber and the first output fiber, coincide with each other at a position where the first filter is located, thus reducing the insertion loss between the first input fiber and the first output fiber.

5. The device as defined in claim 4, wherein spacing between the first input fiber and the first output fiber is predetermined to compliantly match with a center wavelength of the filter.

6. The device as defined in claim 5, wherein spacing between the second input fiber and the second output fiber is predetermined to compliantly match with said center wavelength of the filter.

7. The device as defined in claim 4, wherein a second filter is positioned at a front end of the second GRIN rod lens for enhancement of isolation and reduction of cross-talk.

8. The device as defined in claim 4, wherein said first filter and said second filter face to face confront each other and are joined by adhesives.

9. A multi-port fiber optic device comprising:

first and second collimators opposite to each other;

the first collimator including a first GRIN rod lens and a first fiber ferrule secured with each other, a first input fiber and a first output fiber being received within the first fiber ferrule in a spatial parallel relationship, a first filter being positioned at a front end of the first GRIN rod lens;

the second collimator including a second GRIN rod lens and a second fiber ferrule secured with each other, a second output fiber being received within the second fiber ferrule; wherein the first GRIN rod lens and the second GRIN rod lens are head-to-head confronting each other with the first filter therebetween and bonded by adhesives; wherein said first fiber ferrule includes a pair of V-shaped groove for receiving the first input fiber and the first output fiber therein; wherein two light beams collimated through the first input fiber and the first output fiber, coincide with each other at a position where the first filter is located, thus reducing the insertion loss between the first input fiber and the first output fiber.

10. The device as defined in claim 9, wherein a second filter is positioned at a front end of the second GRIN rod lens for enhancement of isolation and reduction of cross-talk.

* * * * *